US005731371A

United States Patent [19]
Nesbitt et al.

[11] Patent Number: 5,731,371
[45] Date of Patent: Mar. 24, 1998

[54] ZDMA GRAFTED HNBR IN A ONE-PIECE GOLF BALL

[75] Inventors: Robert Dennis Nesbitt, Westfield; Michael J. Sullivan, Chicopee, both of Mass.

[73] Assignee: Lisco, Inc., Tampa, Fla.

[21] Appl. No.: 577,466

[22] Filed: Dec. 18, 1995

[51] Int. Cl.$^6$ .................... A63B 37/06; C08L 51/04; C08L 9/02
[52] U.S. Cl. .................... 524/11; 524/13; 524/34; 524/59; 524/424; 524/426; 524/431; 524/432; 524/433; 524/445; 524/451; 524/452; 524/504; 524/521; 525/72; 525/193; 525/233; 525/274; 473/371; 473/372; 473/377
[58] Field of Search .................... 525/274, 72, 193, 525/233; 473/371, 372, 377; 524/11, 13, 34, 59, 424, 426, 431, 432, 433, 445, 451, 452, 504, 521

[56] References Cited

U.S. PATENT DOCUMENTS

| | | |
|---|---|---|
| 3,313,545 | 4/1967 | Bartsch . |
| 4,266,772 | 5/1981 | Martin et al. . |
| 4,720,526 | 1/1988 | Roland . |
| 4,770,422 | 9/1988 | Isaac . |
| 4,918,144 | 4/1990 | Fukuda . |
| 4,968,753 | 11/1990 | Oyama et al. . |
| 4,990,570 | 2/1991 | Saito et al. . |
| 5,019,319 | 5/1991 | Nakamura et al. . |
| 5,208,294 | 5/1993 | Brown . |
| 5,391,627 | 2/1995 | Araki et al. . |
| 5,506,308 | 4/1996 | Ahmad et al. . |

FOREIGN PATENT DOCUMENTS

| | | |
|---|---|---|
| 073072 | 3/1992 | Japan . |
| 024087 | 1/1995 | Japan . |

*Primary Examiner*—David Buttner

[57] ABSTRACT

The invention provides golf balls formed from the reaction product of compositions comprising an ester grafted hydrogenated nitrile butadiene rubber such as zinc dimethacrylate grafted hydrogenated nitrile butadiene rubber elastomer. The compositions may further include polybutadiene rubber. Balls made of these compositions are especially suited for use in restricted land spaces such as driving ranges.

22 Claims, No Drawings

ZDMA GRAFTED HNBR IN A ONE-PIECE GOLF BALL

FIELD OF THE INVENTION

This invention relates to novel compositions and golf balls which include those compositions. More particularly, the invention relates to restricted flight golf balls.

BACKGROUND OF THE INVENTION

Golf balls comprise, in general, three types. The first type is the three-piece wound ball wherein a vulcanized rubber string is wound under tension around a solid or semi-solid core, and thereafter enclosed in a sheath or covering of tough, protective material. A second type of golf ball is a one-piece ball molded from a solid mass of moldable resilient material which has been cured to develop the necessary degree of hardness to provide utility. One-piece molded balls do not have an enclosing cover. A third type of ball is the two-piece ball that includes a solid core and a cover thereon.

The wound ball, although it has for many years satisfied both the standards of the U.S.G.A. and most golfers, has several disadvantages. For example, a wound ball is difficult to manufacture due to the number of production steps required and the careful control which must be exercised in each stage of manufacture to achieve suitable roundness, velocity or rebound, "click" and "feel" the like. "Click" is the term applied to the sound produced by the ball when dropped on a hard surface or when struck with a golf club. "Feel" refers to how impact of the ball is transmitted through the club to the hands of the golfer. In addition, the cover material for the wound ball has not provided optimum adhesion to the wound core and is susceptible to cutting when struck by a golf club.

One-piece and two-piece golf balls, in contrast to wound golf balls, can be produced with an essentially perfect center of gravity and thus, exhibit excellent aerodynamic properties, superior roll and trueness of flight. One and two-piece golf balls also are highly resistant to cutting and are practically indestructible during use in normal play. These balls return to round even when severely distorted and maintain their superior flight characteristics after extended use. Further, one and two-piece golf balls can be manufactured with better quality than wound balls. One and two-piece balls also maintain their playing characteristics throughout wide temperature ranges, possess an excellent shelf life, and do not water log. Moreover, if paint on one and two-piece golf balls becomes damaged, the balls may be reclaimed by removing or stripping off the old paint and repainting. In contrast, wound balls seldom last long enough to allow repainting.

The durability and distance achieved by two-piece balls is impressive. Indeed, some observers have expressed the concern that land space for many golf courses and driving ranges is insufficient due to the distance achieved by two-piece balls. In an attempt to address this concern, ZIP 7024087 provides a golf ball formed from a composition containing cis-1,4- butadiene rubber, α-β-unsaturated carboxylic acid, and/or its metal salt, organic peroxide, and filler. The composition includes about 3 to about 40 parts by weight acrylonitrile butadiene rubber per 100 pts. wt. of the butadiene rubber. In addition, 2–12 pts. wt. titanium oxide per 100 pts. wt. of the butadiene rubber and 0.0001–0.04 pts wt. blue pigment and a purple pigment per 100 pts. wt. of the butadiene rubber are employed.

Although the art has provided compositions and golf balls useful for restricted land space, a need continues for other compositions and balls which have high durability and which are especially suited for use in restricted land spaces such as small driving ranges and the like.

SUMMARY OF THE INVENTION

In accordance with the invention, novel golf ball compositions and golf balls formed of those compositions are provided. In a preferred aspect, a golf ball formed of a cured composition including an ester grafted hydrogenated nitrile butadiene rubber, more preferably zinc dimethacrylate grafted hydrogenated nitrile butadiene rubber elastomer ("HNBR/ZDMA elastomer") is provided. Even more preferably, the HNBR/ZDMA elastomer is any of the HNBR/ZDMA elastomers sold by ZEON CHEMICALS, INC., Rolling Meadows, Ill., under the following product designations: ZSC 1295, ZSC 2095, ZSC 2195, ZSC 2295, ZSC 2295L, ZSC 2295R, and ZSC 2395, most preferably, ZSC 2295. The compositions of the invention which employ HNBR/ZDMA elastomer therein include a curing agent, preferably a curing agent having peroxide therein, and an optional co-agent for the use with the curing agent. Golf balls formed from the compositions of the invention have performance characteristics which make them especially suited for restricted land spaces such as driving ranges, executive golf courses, and the like.

Further scope of the applicability of the present invention will become apparent from the detailed description given hereinafter. It should, however, be understood that the detailed description and specific examples, while indicating preferred embodiments of the invention, are given by way of illustration only, since various changes and modifications within the spirit and scope of the invention will become apparent to those skilled in the art.

DETAILED DESCRIPTION OF THE INVENTION

The invention provides novel, cured compositions which include carboxylic acid ester grafted hydrogenated nitrile butadiene elastomer. Preferably, the cured compositions are formed from blends of cis-1,4-butadiene rubber and carboxylic acid ester grafted hydrogenated nitrile butadiene. More preferably, the compositions employ blends of zinc salt carboxylic acid ester grafted hydrogenated nitrile butadiene elastomer and cis-1,4-butadiene rubber.

The zinc salt carboxylic acid ester grafted hydrogenated nitrile butadiene elastomer can be any of the zinc salt carboxylic acid ester grafted hydrogenated nitrile butadiene elastomers sold by ZEON CHEMICALS, INC., Rolling Meadows, Ill., under any of the following product designations: ZSC 1295, ZSC 2095, ZSC 2195, ZSC 2295, ZSC 2295L, ZSC 2295R, and ZSC 2395, most preferably, ZSC 2295 having a Mooney viscosity of about 95, about 10% unsaturation and an acrylonitrile content of about 36%. As shown below in, such as, examples 27 and 28, non-hydrogenated acrylonitrile rubber elastomers can be employed. Other non-hydrogenated nitrile butadiene rubbers which can be employed include non-hydrogenated butadiene-acrylonitrile rubber sold by the Bayer Co. under any of the following product designations: KRYNAC 34E35, KRYNAC XN312(butadiene acrylonitrile copolymer), KRYNAC PXL 38.20 and KRYNAC 7.40.

The elastomeric compositions of the invention can be crosslinked by various peroxide containing curing agents. Curing agents which may be employed in the compositions of the invention include, for example, di-tertbutyl peroxide, dicumyl peroxide, benzoyl peroxide, 2,4-dichlorobenzol peroxide, t-butyl-cumyl peroxide, t-butyl perbenzoate, t-butyl peroxide, t-butylperoxy (2-ethyl hexanoate), 2,5-dimethyl-2,5-di(benzoylperoxy)-hexane, benzoyl peroxide, 2,5-dimethyl-2,5-(t-butyl peroxy)-hexane, 1,1-ditert-butyl peroxy-3,3,5-trimethyl cyclohexane, 4,4-ditert-butyl peroxy n-butyl valerate, and n-butyl-4,4-bis(t-butyl peroxy) valerate, preferably n-butyl-4,4-bis(t-butyl peroxy) valerate having about 40% peroxide content.

Other curing agents which may be employed include diacyl or dialkyl peroxides such as α,α'-bis(t-butylperoxy)-isopropylbenzene, 2,5-Dimethyl-2,5-di(t-butylperoxy) hexane, Di-t-butyl peroxide, 2,5-Dimethyl-2,5-di-(t-butylperoxy)hexyne-3, lauroyl peroxide, t-butyl hydroperoxide, t-amyl hydroperoxide, cumene hydroperoxide, t-butyl perbenzoate, t-butyl peroxide, t-butylperoxy (2-ethyl hexanoate), 2,5-dimethyl-2,5-di (benzoylperoxy)-hexane, and benzoyl peroxide. All of the above curing agents are commercially available.

Coagents may be used with the curing agent to ameliorate disadvantages while capitalizing on the desirable characteristics of curing agent. These coagents typically are low molecular weight monomers and are usually either methacrylates, acrylates, cyanurates or isocyanurates. Coagents usually increase crosslink density which results in an increase in the cure state of a peroxide cured elastomer. It is therefore often possible to lower the amount of peroxide required to achieve a given state of cure. A coagent typically does not affect the rate of cure.

Coagents which may be used with the curing agents useful in the invention include, for example, zinc diacrylate, trimethlol propane triacrylate, and trimethloyl propane trimethacrylate, vinyl, allyl, methalyl, furfuryl, crotyl and cinnamyl esters of the following acids: oxatic, maionic, succinic, glutaric, adipic, pimelic, suberic, azelaic, sebacic, maleic, itaconic, citraconic, mesaconic, furmaric, aconitic, phthalic, isophthalic, terephthalic, naphthalene, dicarboxylic, mellitic, pyromellitic, trimesic, acrylic, methacrylic, cennamic, and crotonic. Polyamine amides and imides of the following acids: maleic, itaconic, acrylic, methacrylic crotonic, citaconic, aconitic and cinnamic; polyol esters and anhydrides of acrylic, methacrylic, crotonic and cinnamic acids also may be used. Other co-agents may include materials include di- and triallyl cyanurate; di- and triallylmelamine, divinyl benzene; diallyl benzene; diallyl amine; allyl ether; allyl glycolates; di-, tri and tetravinyl and allyl silanes. All of these co-agents are commercially available.

In addition to the foregoing, filler materials may be employed in the compositions of the invention to control the weight of the ball. Fillers which are incorporated into the compositions should be in finely divided form, as for example, in a size generally less than about 20 mesh, preferably less than about 100 mesh U.S. standard size. Preferably, the filler is a precipitated hydrated silica such as that sold under the trademark HiSil by the Pittsburgh Plate Glass Company. Other fillers which may be employed include, for example, clay, talc, asbestos, glass, carbonates such as calcium carbonate, magnesium carbonate, and the like, metal oxides such as zinc oxide, iron oxide, aluminum oxide, titanium oxide, magnesium oxide, and the like, particulate synthetic plastics such as high molecular weight polyethylene, polypropylene, polystyrene, polyethylene ionomer resins and the like, particulate carbonaceous materials such as carbon black, natural bitumen and the like, as well as cotton flock, cellulose flock, and leather fiber. The amount of filler employed is primarily a function of the weight desirable in the golf ball.

The compositions of the invention also may include various processing aids known in the rubber and molding arts such as fatty acids. Generally, free fatty acids having from 10 to about 40 carbon atoms, preferably having from about 15 to about 20 carbon atoms may be used. Fatty acids which may be used include stearic acid and linoleic acids, as well as mixtures thereof. When included in the compositions of the invention, the fatty acid component is present in amounts of from about 1 to about 15, preferably in amounts of from about 2 to about 5 parts by weight based on 100 parts elastomer. Other processing aids which may be employed include, for example, calcium stearate, barium stearate, zinc stearate, lead stearate, basic lead sulfite, dibasic lead phosphite, dibutyltin dilaurate, dibutyltin dimaleate, dibutyltin mercaptide, as well as dioctyltin and stannane diol derivatives.

Coloring pigments also may be included in the compositions of the invention. Useful coloring pigments include, for example, titanium dioxide, the presence of which simplifies the surface painting operation of the finished ball. In some cases, coloring pigments eliminate the need for painting, such as, for example, where the ball is intended for use on driving ranges.

Filler materials may be employed in the compositions of the invention in an amount of about 0 to about 50 parts, preferably about 5 to about 25 parts by weight per 100 parts elastomer. Processing aids such as fatty acids, metal stearates and the like may be employed in amounts of from about 0 to about 25, preferably from about 5 to about 20 parts by weight per 100 parts elastomer.

Wide latitude may be taken in the formulation of compositions of the invention to provide golf balls of various compressions suitable for every type of golfer. Lower compression balls, generally preferred by the "soft" hitters or lady golfers, may be made by increasing the proportion of the elastomer component. Generally, however, the compositions of the invention are formulated to include about 25 to about 150, preferably about 100 parts by weight zinc dimethyacrylate grafted hydrogenated nitrile butadiene rubber, about 25 to 100, preferably about 50 parts by weight cis 1,4 butadiene rubber, and about 1 to about 5 parts by weight of n-butyl-4,4-bis(t-butyl peroxy) valerate having about 40% peroxide content, all amounts based on total weight of the composition.

A one-piece golf ball or golf ball center for a two-piece ball formed from compositions of the invention may be made by conventional mixing and compounding procedures used in the rubber industry. Typically, a one-piece golf ball is produced by placing uncured, preformed portions or slugs of compositions intended for use as the core of the golf ball between two halves of a conventional press mold that has dimpled golf ball cavities therein. Thereafter, pressure is applied to close the two halves of the mold during the curing process. The volume of the preformed portions placed in the mold cavities is slightly in excess of the actual volume of the ball cavities to enable the cavities to be completely filled when the mold is closed. Thus, an extrudate or flash of excess composition typically is formed at the mating surfaces of the closed cavities.

Typically the compositions of the invention may be cured in the mold by heating at about 275° F. to about 350° F. under sufficient pressure to close the mold for one piece balls or centers for 2-piece balls. The time required for curing the compositions in a mold heated by steam to a temperature of about 320° F. is normally about 10 minutes to about 20 minutes depending upon the amount and activity of the selected initiator and co-agent. Preferably, curing of the compositions of the invention is performed at about 320° F. for about 14 minutes to about 16 minutes at a mold pressure sufficient to close the mold.

After curing, the resulting products are cooled for about 10 minutes in the mold by circulating cold water through the platen. The molded one-piece balls then are subjected to a trimming operation whereby a thin flash line is removed from the equator of the ball. The ball can then converted into a finished one-piece golf ball by painting, stamping and clear coating. Alternatively, when a two-piece ball is desired, the core is surface treated to facilitate adhesion thereof to the covering compositions of the invention. Surface treatment of the core or molded ball can be performed by techniques known in the art such as corona discharge, ozone treatment, sand blasting and the like. Preferably, surface treatment is effected by abrading with an abrasive brush.

When forming two-piece balls which employ the compositions of the invention as golf ball centers, various cover materials compositions may be applied to those centers by any one of a variety of known molding techniques, e.g. injection, compression or transfer molding. Useful cover materials include blends of ethylene-acrylic acid or ethylene-methacrylic acid, as well as copolymers neutralized with mono- or divalent metals such as sodium, potassium, lithium, calcium, zinc or magnesium. Such compositions are shown in U.S. Pat. No. 5,368,304, the disclosure of which is incorporated herein by the entirety by reference.

Although the compositions of the invention are especially suited for use as one-piece balls and centers for two-piece balls, these compositions also may be employed as covers materials for two-piece balls. When employing the compositions of the invention as golf ball covers, the components are intimately mixed, using, for example, two roll mills or a Banbury mixer until the mixture is uniform, usually over a period of from about 5 to about 20 minutes. The sequence of addition of components is not critical. A preferred mixing sequence is one wherein ZDMA/HNBR elastomer, cis-1,4 polybutadiene and additive are blended for about 5 minutes in a Banbury mixer. The crosslinking agent and optional co-agent are then added and the mixing continued for one minute, whereupon the batch is discharged onto a two roll mill, mixed for about one additional minute and formed into a sheet. The temperature of the mixing is not critical, but should, of course, be below the curing temperature. Mixing is generally done at room temperature, although through friction, the ingredients will be warmed and cooling water is channeled through the mixer to keep the stock temperature below the curing temperature.

In the examples in Tables I–III below, one-piece balls are prepared in accordance with the procedures discussed above. In these examples, all components are given in parts by weight. Ball weight is expressed in grams. Compression is expressed as PGA compression. In Table I, all examples are performed at a mold temperature of 320° F. for 16 minutes at a mold pressure sufficient to keep the mold closed. In Table II, all examples are molded at a temperature of 320° F. for 15 minutes at a mold pressure sufficient to keep the mold closed. In Table III, all examples are performed at a temperature of 320° F. for 14 minutes at a mold pressure sufficient to keep the mold closed. Sources for the tradename materials shown in Tables I–III are given below:

| Tradename Material | Source |
| --- | --- |
| ZSC 2295 | ZEON Chemical Co. |
| CARIFLEX BR 1220 | Shell Chemical Co. |
| ZETPOL 2020 | ZEON Chemical Co. |
| KRYNAC XN 312 | Bayer |
| KRYNAC X 740 | Bayer |
| KRYNAC 34 E 35 | Bayer |
| 230 XL | RT Vanderbilt Co. |
| 231 XL | RT Vanderbilt Co. |
| SR 365C | Zinc dimethacrylate from SARTOMER RESIN CO. |
| HiSil 233 | PPG Industries |
| PXL 3820 | Bayer |

In Tables I–III, the coefficient of restitution and compression are determined as set forth below:

Coefficient of restitution (C.O.R.) Is measured by firing the golf ball in an air cannon at a velocity of 125 feet per second against a steel plate positioned 12 feet from the muzzle of the cannon. The rebound velocity is then measured.

PGA compression is determined by a force applied to a spring (i.e. 80 PGA=80 Riehle; 90 PGA compression=70 Riehle compression; and 100 PGA=60 Riehle) and manufactured by Atti Engineering, Union City, N.J., where Riehle compression is a measurement of the deformation of a golf ball in thousandths of inches under a fixed initial load of 200 pounds (a Riehle compression of 47 corresponds to a deflection under lead of 0.047 inches). Measurement of coefficient of restitution and compression is described in U.S. Pat. No. 5,368,304, the teachings of which are incorporated in their entirety by reference herein.

TABLE 1

| EXAMPLES COMPONENT | ZSC 2295 | CARIFLEX BR 1220 | ZETPOL 2020 | KRYNAC XN312 | KRYNAC X 740 | KRYNAC 34E35 | 230 XL | 231 XL | STEARIC ACID | ZnO |
| --- | --- | --- | --- | --- | --- | --- | --- | --- | --- | --- |
| 1 | 100 | — | — | — | — | — | 4 | — | — | 5 |
| 2 | 100 | 25 | — | — | — | — | 4 | — | — | 5 |
| 3 | 100 | 50 | — | — | — | — | 4 | — | — | 5 |
| 4 | 50 | 50 | — | — | — | — | 3 | — | — | 2.5 |
| 5 | 60 | 40 | — | — | — | — | 4 | — | — | — |
| 6 | 60 | 40 | — | — | — | — | 4 | — | — | 5 |
| 7 | 60 | 60 | — | — | — | — | 4 | — | — | 5 |
| 8 | 60 | 60 | — | — | — | — | 6 | — | — | 5 |
| 9 | 60 | 60 | — | — | — | — | 6 | — | 2 | 5 |
| 10 | 50 | 50 | — | — | — | — | 2 | — | — | — |
| 11 | 50 | 50 | — | — | — | — | 3 | — | — | — |
| 12 | 50 | 50 | — | — | — | — | 4 | — | — | — |
| 13 | 50 | 50 | — | — | — | — | 5 | — | — | — |
| 14 | 53 | 47 | — | — | — | — | — | 1 | — | — |

TABLE 1-continued

| | | | | | | | | | | |
|---|---|---|---|---|---|---|---|---|---|---|
| 15 | 53 | 47 | — | — | — | — | — | 1 | — | — |
| 16 | 25 | 75 | — | — | — | — | 3 | — | — | — |
| 17 | 25 | 75 | — | — | — | — | 3 | — | — | — |
| 18 | 25 | 75 | — | — | — | — | 3 | — | — | 5 |
| 19 | — | — | 100 | — | — | — | 4 | — | — | — |
| 20 | — | — | 100 | — | — | — | 4 | — | — | 5 |
| 21 | — | — | 100 | — | — | — | 4 | — | — | 5 |
| 22 | — | 100 | 100 | — | — | — | 2 | — | — | 2.5 |
| 23 | — | 100 | 100 | — | — | — | 2 | — | — | 2.5 |
| 24 | — | — | — | 100 | — | — | 3 | — | — | 5 |
| 25 | — | — | — | — | 100 | — | 3 | — | — | — |
| 26 | — | — | — | — | — | 100 | 3 | — | — | 5 |

| EXAMPLES COMPONENT | ZDA[1] | SR 365C | HiSiL 233 | TiO2 | LIME-STONE | BALL WT. (gm) | COMPRESSION (PGA) | CUT RESISTANCE[2] | COR[3] |
|---|---|---|---|---|---|---|---|---|---|
| 1 | — | — | — | — | — | 52.6 | 115 | NC,SM | — |
| 2 | — | — | — | — | — | 49.2 | 120 | — | — |
| 3 | — | — | — | — | — | 46.9 | 110 | — | — |
| 4 | — | — | — | — | — | 44.6 | 65 | NM | — |
| 5 | — | — | — | — | — | 45.4 | 110 | NM | — |
| 6 | — | — | — | — | — | 46.9 | 105 | NM | — |
| 7 | — | — | — | — | — | 45.5 | 73 | NM | — |
| 8 | — | — | — | — | — | 45.8 | 80 | NM | — |
| 9 | — | — | — | — | — | 45.6 | 75 | NM | — |
| 10 | — | — | — | — | — | 44.3 | 70 | NM | — |
| 11 | — | — | — | — | — | 44.5 | 80 | — | — |
| 12 | — | — | — | — | — | 44.7 | 80 | — | — |
| 13 | — | — | — | — | — | 44.8 | 85 | — | — |
| 14 | — | — | — | — | 6 | 45.5 | 85 | NM | .664 |
| 15 | 5 | — | — | — | 6 | 46.4 | 95 | SM | — |
| 16 | 10 | — | — | — | — | 42.5 | 15 | NM | — |
| 17 | 20 | — | — | — | — | 44.1 | 60 | NM | — |
| 18 | 20 | — | — | — | — | 45.5 | 60 | NM | — |
| 19 | — | 50 | — | — | — | 47.8 | — | — | — |
| 20 | — | 50 | — | — | — | 47.8 | — | — | — |
| 21 | — | 80 | — | — | — | 50.6 | 125 | — | — |
| 22 | — | 40 | — | — | — | 43.4 | 60 | NM | — |
| 23 | — | 60 | — | — | — | 44.6 | 95 | NM | — |
| 24 | — | 32 | 6 | 2 | — | 47.6 | 75 | — | .555 |
| 25 | — | 32 | 6 | 2 | — | 47.1 | 110 | — | .501 |
| 26 | — | 32 | 6 | 2 | — | 48.3 | 70 | — | .450 |

[1]-ZINC DIACRYLATE
[2]-GUILLOTINE TEST: NC = NOT CUT, NM = NOT MARKED, SM = SMALL MARK
[3]-COEFFICIENT OF RESTITUTION

TABLE II

| EXAMPLE/COMPONENT | 27 |
|---|---|
| KRYNAC XN-312 | 50 |
| CARIFLEX BR 1220 | 50 |
| 230 XL | 3 |
| ZnO | 5 |
| ZDMA[1] | 32 |
| HiSiL 233 | 6 |
| TiO2 | 2 |
| BALL WT. (grams) | 46.4 |
| COMPRESSION (PGA) | 80 |
| CUT RESISTANCE[2] | NC |
| COR[3] | .653 |

[1]-ZINC DIMETHACRYLATE
[2]-GUILLOTINE TEST
[3]-COEFFICIENT OF RESTITUTION

TABLE III

| EXAMPLE/COMPONENT | 28 |
|---|---|
| CARIFLEX BR 1220 | 80 |
| PXL 3820 | 20 |
| KRYNAC XN312 | 20 |
| 230 XL | 3 |
| ZnO | 5 |
| ZDMA[1] | 32 |
| HiSiL | 6 |
| TiO2 | 2 |
| BALL WT. (grams) | 45.8 |
| COMPRESSION (PGA) | 82 |
| CUT RESISTANCE[2] | — |
| COR[3] | .726 |

[1]-ZINC DIMETHACRYLATE
[2]-GUILLOTINE TEST
[3]-COEFFICIENT OF RESTITUTION

The "Guillotine Cut Test" is performed by holding the ball firmly in a cavity to expose the top half of the ball. A guillotine blade weighing 5 pounds and having inner and outer blade edge angles of 90° and 60°, respectively, and a cutting edge of three sixty- fourths inch radius is dropped from a height of 3.5 feet to strike the ball at a point one-half inch off the top center point. The guillotine blade is guided during the drop by means of a substantially friction-free vertical track. The drops are repeated until ball failure occurs, ball failure defined as permanent damage evidenced by a crack or by removal of a segment from the ball surface.

While the present invention relates most particularly to the use of a novel composition of matter in a golf ball, other extensive applications may also be mentioned. These include, for example, the manufacture of printing plates, coverings for rolls or the manufacture of rolls per se, protective bumpers, bowling balls, insulators, floor tiles, shoe soles and heels, battery boxes, solid tired and the like. Other applications are possible for the compositions of the invention where properties of resilience, toughness and high impact resistance are required.

While certain representative embodiments and details of the present invention have been shown for the purposes of illustrating the invention, it will be apparent to those skilled in the art that various changes and modifications may be made therein without departing from the spirit or scope of the invention.

What is claimed is:

1. A cured composition comprising a blend comprising a zinc salt unsaturated carboxylic acid ester grafted hydrogenated nitrile butadiene elastomer, cis-1,4-polybutadiene rubber, a curing agent for said elastomer, and at least one additive selected from the group consisting of fillers, pigments, coloring agents, and mixtures thereof, wherein said zinc salt unsaturated carboxylic acid ester grafted hydrogenated nitrile butadiene elastomer is present in the composition in an amount of at least about 100 parts by weight per 100 parts cis-1,4-polybutadiene rubber.

2. The composition of claim 1 wherein said zinc salt unsaturated carboxylic acid ester is zinc dimethacrylate, and said blend contains about 1 to abut 5 parts by weight of n-butyl-4,4-bis(t-butyl peroxy) valerate having about 40% peroxide content, all mounts based on total weight of the composition.

3. The composition of claim 2 wherein said blend comprises about 100 parts by weight zinc dimethyacrylate grafted nitrile butadiene elastomer, about 50 parts by weight cis 1,4 polybutadiene rubber, and about 3 parts by weight of n-butyl-4,4-bis(t-butyl peroxy) valerate having about 40% peroxide content, all amounts based on total weight of the composition.

4. The composition of claim 1 wherein said curing agent is selected from the group consisting of di-tertbutyl peroxide, dicumyl peroxide, benzoyl peroxide, 2,4-dichlorobenzol peroxide, t-butyl-cumyl peroxide, t-butyl perbenzoate, t-butyl peroxide, t-butylperoxy (2-ethyl hexanoate), 2,5-dimethyl-2,5-di(benzoylperoxy)-hexane, benzoylperoxide, 2,5-dimethyl-2,5-(t-butylperoxy)-hexane, 1,1-ditert-butyl peroxy-3,3,5-trimethyl cyclohexane, 4,4-ditert-butyl peroxy n-butyl valerate, α,α'bis(t-butylperoxy)-isopropylbenzene, 2,5-Dimethyl-2,5-di(t-butylperoxy)hexane, Di-t-butyl peroxide, 2,5-Dimethyl-2,5-di-(t-butylperoxy)hexyne-3, lauroyl peroxide, t-butyl hydroperoxide, t-amyl hydroperoxide, cumene hydroperoxide, t-butyl perbenzoate, t-butyl peroxide, t-butylperoxy (2-ethyl hexanoate), 2,5-dimethyl-2,5-di(benzoylperoxy)-hexane, benzoyl peroxide, and n-butyl-4,4-bis(t-butyl peroxy) valerate having about 40% peroxide content.

5. The composition of claim 4 wherein said curing agent is n-butyl-4,4-bis(t-butyl peroxy) valerate having about 40% peroxide content.

6. The composition of claim 1 wherein said additive is a filler selected from the group consisting of precipitated hydrated silica, clay, talc, .asbestos, glass, calcium carbonate, magnesium carbonate, zinc oxide, iron oxide, aluminum oxide, titanium oxide, magnesium oxide, polyethylene, polystyrene, polyethylene ionomer resins, carbon black, natural bitumen, cotton flock, cellulose flock, and leather fiber.

7. The composition of claim 1 wherein said additive is a coloring pigment.

8. The composition of claim 7 wherein said coloring pigment is titanium dioxide.

9. The composition of claim 1 wherein said additive is a filler present in an amount up to about 50 parts by weight per 100 parts elastomer.

10. The composition of claim 1 wherein said additive is a filler present in an amount of about 50 to about 25 parts by weight per 100 parts elastomer.

11. A golf ball having a cured composition comprising a blend comprising a zinc salt unsaturated carboxylic acid ester grafted hydrogenated nitrile butadiene elastomer, cis-1,4-butadiene rubber, a curing agent for said elastomer, and at least one additive selected from the group of consisting of fillers, pigments, coloring agents, and mixtures thereof, wherein said zinc salt unsaturated carboxylic acid ester grafted hydrogenated nitrile butadiene elastomer is present in an amount of at least about 100 parts by weight per 100 parts cis-1,4-polybutadiene rubber.

12. The ball of claim 11 wherein said curing agent is selected from the group consisting of di-tertbutyl peroxide, dicumyl peroxide, benzoyl peroxide, 2,4-dichlorobenzol peroxide, t-butyl-cumyl peroxide, t-butyl perbenzoate, t-butyl peroxide, t-butylperoxy (2-ethyl hexanoate), 2,5-dimethyl-2,5-di(benzoylperoxy)-hexane, benzoyl peroxide, 2,5-dimethyl-2,5-(t-butyl peroxy)-hexane, 1,1-ditert-butyl peroxy-3,3,5-trimethyl cyclohexane, 4,4-ditert-butyl peroxy n-butyl valerate, α,α'-bis(t-butylperoxy)-isopropylbenzene, 2,5-Dimethyl-2,5-di(t-butylperoxy)hexane, Di-t-butyl peroxide, 2,5-Dimethyl-2,5-di-(t-butylperoxy)hexyne-3, lauroyl peroxide, t-butyl hydroperoxide, t-amyl hydroperoxide, cumene hydroperoxide, t-butyl perbenzoate, t-butyl peroxide, t-butylperoxy (2-ethyl hexanoate), 2,5-dimethyl-2,5-di(benzoylperoxy)-hexane, benzoyl peroxide, and n-butyl-4,4-bis(t-butyl peroxy) valerate having about 40% peroxide content.

13. The ball of claim 12 wherein said curing agent is n-butyl-4,4-bis(t-butyl peroxy) valerate having about 40% peroxide content.

14. The ball of claim 11 wherein said additive is a filler selected from the group consisting of precipitated hydrated silica, clay, talc, asbestos, glass, calcium carbonate, magnesium carbonate, zinc oxide, iron oxide, aluminum oxide, titanium oxide, magnesium oxide, polyethylene, polystyrene, polyethylene ionomer resins, carbon black, natural bitumen, cotton flock, cellulose flock, and leather fiber.

15. The ball of claim 11 wherein said additive is a coloring pigment.

16. The ball of claim 14 wherein said coloring pigment is titanium dioxide.

17. The ball of claim 11 wherein said additive is a present filler in an amount up to about 50 parts by weight per 100 parts elastomer.

18. The ball of claim 11 wherein said additive is a filler present in an amount of about 5 to about 25 parts by weight per 100 parts elastomer.

19. The ball of claim 11 wherein said zinc salt unsaturated carboxylic acid ester is zinc dimethacrylate, and said blend contains about 1 to about 5 parts by weight of n-butyl-4,4-bis(t-butyl peroxy) valerate having about 40% peroxide content, all amounts based on total weight of the composition.

20. The ball of claim 1 wherein said blend comprises about 100 parts by weight zinc dimethyacrylate grafted nitrile butadiene elastomer, about 50 parts by weight cis-1,4 butadiene rubber, and about 3 parts by weight of n-butyl-4,4-bis(t-butyl peroxy) valerate having about 40% peroxide content, all amounts based on total weight of the composition.

21. The ball of claim 19 wherein said ball is a one-piece ball.

22. The ball of claim 19 wherein said golf ball is a two-piece ball having a cover wherein said cover comprises said cured composition.

* * * * *